United States Patent
Obrecht et al.

(10) Patent No.: US 10,494,467 B2
(45) Date of Patent: *Dec. 3, 2019

(54) COPOLYMER RUBBER CONTAINING NITRILE GROUPS

(71) Applicant: ARLANXEO Deutschland GmbH, Dormagen (DE)

(72) Inventors: Werner Obrecht, Moers (DE); Hiyam Salem, Cologne (DE); Susanna Lieber, Kaiserslautern (DE); Irene Moll, Neuss (DE); Andreas Kaiser, Strasbourg (FR)

(73) Assignee: ARLANXEO DEUTSCHLAND GMBH, Dormagen (DE)

( * ) Notice: Subject to any disclaimer, the term of this patent is extended or adjusted under 35 U.S.C. 154(b) by 64 days.

This patent is subject to a terminal disclaimer.

(21) Appl. No.: 15/032,076

(22) PCT Filed: Oct. 29, 2014

(86) PCT No.: PCT/EP2014/073238
§ 371 (c)(1),
(2) Date: Apr. 26, 2016

(87) PCT Pub. No.: WO2015/063162
PCT Pub. Date: May 7, 2015

(65) Prior Publication Data
US 2016/0257773 A1   Sep. 8, 2016

(30) Foreign Application Priority Data
Oct. 30, 2013 (EP) .................................... 13290264

(51) Int. Cl.
*C08F 236/12* (2006.01)
*C08F 236/06* (2006.01)
*C08L 9/02* (2006.01)
*C08L 15/00* (2006.01)

(52) U.S. Cl.
CPC .......... *C08F 236/12* (2013.01); *C08F 236/06* (2013.01); *C08L 9/02* (2013.01); *C08L 15/005* (2013.01)

(58) Field of Classification Search
CPC .... C08F 236/06; C08F 236/12; C08L 15/005; C08L 9/02
USPC ...................................................... 526/329
See application file for complete search history.

(56) References Cited

U.S. PATENT DOCUMENTS

| | | |
|---|---|---|
| 3,700,637 A | 10/1972 | Finch |
| 4,337,329 A | 6/1982 | Kubo et al. |
| 4,384,081 A | 5/1983 | Kubo et al. |
| 4,452,951 A | 6/1984 | Kubo et al. |
| 4,464,515 A | 8/1984 | Rempel et al. |
| 4,503,196 A | 3/1985 | Rempel et al. |
| 4,581,417 A | 4/1986 | Buding et al. |
| 4,956,417 A | 9/1990 | Hayashi et al. |
| 6,548,604 B1 | 4/2003 | Kotsuji et al. |
| 6,812,312 B1 | 11/2004 | Ito et al. |
| 7,951,875 B2 | 5/2011 | Guerin et al. |
| 8,044,147 B2 | 10/2011 | Nagamori et al. |
| 8,372,918 B2 | 2/2013 | Lizuka |
| 9,725,547 B2 | 8/2017 | Brandau et al. |
| 9,868,806 B2 | 1/2018 | Brandau et al. |
| 2005/0085593 A1 | 4/2005 | Tsukada et al. |
| 2008/0293868 A1* | 11/2008 | Obrecht ................. C08C 1/14 524/439 |
| 2011/0190441 A1 | 8/2011 | Brandau et al. |
| 2014/0114025 A1 | 4/2014 | Brandau et al. |
| 2014/0114026 A1* | 4/2014 | Brandau ............. C08K 5/0091 525/329.3 |
| 2014/0378918 A1 | 12/2014 | Brandau et al. |
| 2015/0056392 A1* | 2/2015 | Li ........................ C08L 23/16 428/36.9 |

FOREIGN PATENT DOCUMENTS

| | | |
|---|---|---|
| DE | 2539132 A1 | 3/1977 |
| EP | 1247835 A1 | 10/2000 |
| JP | 63095242 A | 4/1988 |
| JP | 06073220 A | 3/1994 |
| JP | 2011099100 | 5/2011 |
| JP | 2012031311 A | 2/2012 |
| WO | 2012089804 A1 | 7/2012 |
| WO | 2012089817 A1 | 7/2012 |
| WO | 2013053761 A1 | 4/2013 |
| WO | 2013053763 A1 | 4/2013 |

OTHER PUBLICATIONS

Ullmann's Encyclopedia of Industrial Chemistry, VCH Verlagsgesellschaft mbH, D-69451 Weinheim, 1993, vol. A 23 "Chemicals and Additives", p. 366-417.
Houben-Weyl, Methoden der Organischen Chemie Methods of Organic Chemistry, vol. 14/1, 30 Georg Thieme Verlag Stuttgart 1961.
European Search Report from co-pending Application EP 13290264 dated Apr. 17, 2014, 3 pages.
Li, Ming "Study on preparation and properties of gel polymer electrolytes based on comb-like copolymer matrix of poly (ethylene glycol) monomethylether grafted carboxylated butadiene-acrylonitrile rubber", J. Polym Res (2012), School of Chemistry and Chemical Engineering, Shanghai Jiao Tong University Shanghai China.
European Search Report from co-pending Application dated Oct. 29, 2014, 2 pages.

* cited by examiner

*Primary Examiner* — Wenwen Cai
(74) *Attorney, Agent, or Firm* — Norris McLaughlin, PA

(57) ABSTRACT

A copolymer rubber includes, based on a total amount of 100% by weight of all monomer units, α,β-ethylenically unsaturated nitrile units, conjugated diene units, and α,β-ethylenically unsaturated monocarboxylic acid monoester units selected from the group consisting of methoxyethyl (meth)acrylates, and polyethylene glycol (meth)acrylates. The rubber has a glass transition temperature lower than −20° C., an oil swelling of not more than 20 vol %, and provides a balance of good low-temperature stability and oil resistance.

3 Claims, No Drawings

COPOLYMER RUBBER CONTAINING NITRILE GROUPS

The present invention relates to copolymer rubbers containing nitrile groups, to the preparation thereof, to vulcanizable mixtures comprising copolymer rubbers containing nitrile groups and to the production thereof, and to vulcanizates based on copolymer rubbers containing nitrile groups, to the production thereof and to the use thereof as technical material.

Copolymer rubbers containing nitrile groups (nitrile rubber, also abbreviated to "NBR") are understood to mean rubbers which are co-, ter- or quaterpolymers of at least one α,β-ethylenically unsaturated nitrile, at least one conjugated diene and optionally one or more additional copolymerizable monomers. This explicitly also includes partly or fully hydrogenated copolymer rubbers containing nitrile groups ("HNBR"). Hydrogenated copolymer rubber containing nitrile groups is understood to mean corresponding co-, ter- or quaterpolymers in which all or some of the C=C double bonds of the polymerized diene units have been hydrogenated.

For many years, both NBR and HNBR have occupied an established position in the specialty elastomers sector. They possess an excellent profile of properties, in the form of excellent oil resistance, good heat stability and excellent resistance to ozone and chemicals, the latter being even more pronounced in the case of HNBR than in the case of NBR. NBR and HNBR also have very good mechanical and performance properties. For this reason, they are widely used in a wide variety of different fields of use, and are used, for example, for production of gaskets, hoses, belts and damping elements in the automotive sector, and also for stators, well seals and valve seals in the oil production sector, and also for numerous parts in the electrical industry, mechanical engineering and shipbuilding. One of the main uses of HNBR is in drive belts. In the automobile industry, there is a trend in the direction of using internal belts rather than metal chains or external drives, in order to enable more compact designs of the engine with lower weights. These belts work directly in the engine oil, the maximum possible temperatures in the engine space being up to 150° C. In order to enable trouble-free operation of the engine, the belt should have only minimal oil swelling. At the same time, it is desirable for the belt to have very good low-temperature flexibility down to −35° C. The latter prevents the rupture of the belt when the engine is started at low temperatures. A multitude of different HNBR types are commercially available, and these feature, according to the application sector, different monomers, molecular weights, polydispersities and mechanical and physical properties. As well as the standard types, there is increasing demand particularly for specialty types featuring contents of specific termonomers or particular functionalizations.

For example, EP 2145920 A1 discloses a vulcanizable polymer composition containing diene monomers, nitrile monomers and various termonomers, for example carboxylic acids and esters thereof, which is characterized by a specific combination of polyamine crosslinking agents and specific crosslinking accelerator. Polymer vulcanizates based on such polymer compositions and processes for production of such polymer vulcanizates have been described, especially mouldings.

EP 2392599 A1 discloses a highly saturated quaternary diene rubber containing nitrile groups, comprising 5% to 80% by weight of α,β-ethylenically unsaturated nitrite units, 0.1% to 20% by weight of α,βethylenically unsaturated dicarboxylic acid monoesters as crosslinkable monomers, 11% to 50% by weight of alkoxyalkyl (meth)acrylate monomer units, and 20% to 83.9% by weight of conjugated diene monomer units which are at least partly hydrogenated and have improved low-temperature stability.

EP 1852447 A1 discloses a highly saturated terpolymer rubber containing nitrite groups, having 10% to 40% by weight of α,β-ethylenically unsaturated nitrile units, 10% to 80% by weight of α,β-ethylenically unsaturated carboxylic ester units, for example butyl acrylate and ethylhexyl acrylate, and 20% to 70% by weight of a conjugated diene unit, which has a vulcanizate having balanced properties.

EP 1247835 A discloses a highly saturated copolymer rubber containing nitrile groups, containing (a) 10% to 40% by weight of α,β-ethylenically unsaturated nitrile units, (b) 10% to 60% by weight of α,β-ethylenically unsaturated carboxylic ester units, (c) 0.01% to 21% by weight of conjugated diene units and 14% to 69.99% by weight of saturated conjugated diene units, where the sum total of the monomer units (c) and (d) is 20% to 70% by weight, and the ratio of the monomer units (d)/[(c)+(d)] is at feast 70% by weight and the difference between the extrapolated glass transition initiation temperature (Tig) and the extrapolated glass transition end temperature (Teg) is not greater than 10° C. Vulcanized products of the copolymer rubber have good cold stability and oil resistance, and good dynamic properties.

In addition, EP 1243602 A discloses a terpolymer containing (a) 0% to 20% by weight of 1,3-butadiene units, (b) 0% to 50% by weight of saturated 1,3-butadiene units, (c) 40% to 50% by weight of α,β-ethylenically unsaturated nitrile units and (d) 10% to 35% by weight and at least 8 mol % of other monomer units, where the sum total of the 1,3-butadiene units (a) and the saturated 1,3-butadiene units (b) is in the range from 30% to 50% by weight. This highly saturated copolymer rubber containing nitrite groups has good oil resistance in the vulcanized product. Examples of terpolymers having a low termonomer content of 3% and 8% by weight of butyl acrylate are disclosed as comparative examples.

JP 2012-031311 A describes a highly saturated copolymer rubber containing nitrile groups, containing (a) 10.0% to 40.0% by weight of a α,β-ethylenically unsaturated nitrile units, (b) 5.5% to 10.0% by weight of a α,β-ethylenically unsaturated dicarboxylic acid monoester units, (c) 11.0% to 30.0% by weight of alkoxyalkyl ester (meth)acrylate units having alkoxyalkyl groups having 2 to 8 carbon atoms, and (d) 20.0% to 73.5% by weight of conjugated diene units, where at least a portion of the conjugated diene units has been hydrogenated.

Li et al. disclose, in J. Polym. Res, 2012, 19, 9853, the graft polymerization of polyethylene glycol monoalkyi ethers onto XNBR. The graft polymerization of polyethylene glycol monoalkyl ethers lowers the glass transition temperature. There is no information relating to the oil resistance of vulcanizates.

The existing types of copolymer rubbers containing nitrile groups only partly meet the requirement for minimal oil swelling and very good low-temperature flexibility, since oil swelling and low-temperature flexibility (glass transition temperature Tg) cannot be adjusted independently of one another. Typically, there are relationships in HNBR between the ACM content, the glass transition temperature and the oil swelling. This means that there is a decrease in oil swelling with rising ACN content, i.e. elevated polarity. At the same time, however, there is a rise in glass transition temperature. Past attempts to achieve a reduction in the glass transition temperature with constant oil swelling or a reduction in oil swelling with constant glass transition temperature through incorporation of various termonomers have been unsuccessful. Therefore, the known terpolymers are still unsatisfactory for particular end uses.

Accordingly, one of the problems addressed by the present invention was that of providing a copolymer rubber containing nitrile groups which has a balance of good low-temperature stability and oil resistance, which overcomes the disadvantages of the prior art.

The solution to the problem and the subject-matter of the present invention is a copolymer rubber containing nitrile groups, comprising
  a) 10% to 80% by weight, preferably 20% to 50% by weight and more preferably 34% to 43% by weight of an α,β-ethylenically unsaturated nitrile unit,
  b) 31% to 89.0% by weight, preferably 42% to 78.75% by weight and more preferably 49% to 84.5% by weight of a conjugated diene unit and
  c) 1% to 9% by weight, preferably 1.25% to 8% by weight and more preferably 1.5% to 8% by weight of at least one α,β-ethylenically unsaturated monocarboxylic acid monoester unit.

In an alternative embodiment of the invention, at least some of the conjugated diene units have been hydrogenated.

It should be noted at this point that the scope of the invention includes any and all possible combinations of the components, ranges of values and/or process parameters mentioned above and cited hereinafter, in general terms or within areas of preference.

The term copolymer encompasses polymer having more than one monomer unit. In one embodiment of the Invention, the copolymer is derived exclusively, for example, from the three monomer types (a), (b) and (c) described, and is therefore a terpolymer. The term "copolymer" likewise encompasses, for example, additionally quaterpolymers, derived from the three monomer types (a), (b) and (c) described and a further monomer unit.

α,β-Ethylenically Unsaturated Nitrile

The α,β-ethylenically unsaturated nitrile used, which forms the α,β-ethylenically unsaturated nitrile units (a), may be any known α,β-ethylenically unsaturated nitrile. Preference is given to ($C_3$-$C_5$)-α,β-ethylenically unsaturated nitriles such as acrylonitrile, α-haloacrylonitrile, for example α-chloroacrylonitrile and α-bromoacrylonitrile, α-alkylacrylonitrile, for example methacrylonitrile, ethacrylonitrile or mixtures of two or more α,β-ethylenically unsaturated nitriles. Particular preference is given to acrylonitrile, methacrylonitrile, ethacrylonitrile or mixtures. Very particular preference is given to acrylonitrile.

The amount of α,β-ethylenically unsaturated nitrite units (a) is typically in the range from 10% to 80% by weight, preferably 20% to 50% by weight, more preferably from 34% to 43% by weight, based on the total amount of 100% by weight of all the monomer units.

Conjugated Diene

The conjugated diene, which forms the conjugated diene unit (b), may be of any type, especially conjugated $C_4$-$C_{12}$ dienes. Particular preference is given to 1,3-butadiene, isoprene, 2,3-dimethylbutadiene, 1,3-pentadiene (piperylene) or mixtures thereof. Especially preferred are 1,3-butadiene and isoprene or mixtures thereof. Very particular preference is given to 1,3-butadiene.

The amount of conjugated diene is typically in the range from 31% to 89.0% by weight, preferably 42% to 78.75% by weight, more preferably 49% to 84.5% by weight, based on the total amount of 100% by weight of all the monomer units.

α,β-Ethylenically Unsaturated Monocarboxylic Acid Monoester Unit

In addition to the α,β-ethylenically unsaturated nitrile units and the conjugated diene units, the copolymer rubber containing nitrile groups includes, as a third unit, α,β-ethylenically unsaturated monocarboxylic acid monoester units.

α,βEthylenically unsaturated monocarboxylic and monoester units may, for example, be those derived from (meth)acrylates [(meth)acrylates in the context of this Invention represents "acrylates" and "methacrylates"] and derivatives or mixtures thereof.

Preferred monomers for the α,β-ethylenically unsaturated monocarboxylic acid monoester units are as follows:
alkyl (meth)acrylate, especially $C_4$-$C_{20}$-alkyl (methlacrylate, n-butyl (meth)acrylate, tert-butyl (meth)acrylate, hexyl (meth)acrylate, 2-ethylhexyl (meth)acrylate, octyl (meth)acrylates 2-propylheptyl acrylate and n-dodecyl (meth)acrylate,
alkoxyalkyl (meth)acrylate, especially $C_1$-$C_{18}$-alkoxyalkyl (meth)acrylate, preferably methoxymethyl (meth)acrylate, methoxyethyl (meth)acrylate, ethoxyethyl (meth) acrylate and ethoxymethyl (meth)acrylate,
aryl (meth)acrylate, especially $C_6$-$C_{14}$-aryl (meth)acrylate, preferably $C_6$-$C_{10}$-aryl (meth)acrylate,
cycloalkyl (meth)acrylate, especially $C_5$-$C_{12}$-cycloalkyl (meth)acrylate, preferably $C_6$-$C_{12}$cycloalkyl (meth)acrylate,
cyanoalkyl (meth)acrylate, especially $C_4$-$C_{18}$-cyanoalkyl (meth)acrylate, preferably α-cyanoethyl (meth)acrylate, β-cyanoethyl (meth)acrylate and cyanobutyl (meth)acrylate,
hydroxyalkyl (meth)acrylate, especially $C_4$-$C_{18}$-hydroxyalkyl (meth)acrylate, preferably 2-hydroxyethyl (meth) acrylate and 3-hydroxypropyl (meth)acrylate,
fluorine-substituted (meth)acrylate containing benzyl groups, preferably fluorobenzyl (meth)acrylate,
(meth)acrylate containing fluoroalkyl groups, preferably trifluoroethyl (meth)acrylate, and
(meth)acrylate containing aminoalkyl groups, such as dimethylaminomethyl acrylate and diethylaminoethyl acrylate.

Further preferred αβ-ethylenically unsaturated monocarboxylic acid monoester units are those derived from polyethylene glycol (meth)acrylate, polypropylene glycol (meth) acrylate, polyethylene-propylene glycol (meth)acrylate, glycidyl (meth)acrylate, epoxy (meth)acrylate or urethane (meth)acrylate, preferably methoxy or ethoxy polyethylene glycol (meth)acrylate having 1 to 20 repeat ethylene glycol units, preferably methoxy or ethoxy polyethylene glycol (meth)acrylate having 1 to 5 repeat ethylene glycol units.

These α,β-ethylenically unsaturated monocarboxylic acid monoesters can be purchased commercially, for example from GEO under the Bisomer® trade name or from Miwon under the Miramer® trade name.

The amount of the α,β-ethylenically unsaturated monocarboxylic acid monoesters is typically in the range from 1% to 9% by weight, preferably 1.25% to 8% by weight and more preferably 1.5% to 8% by weight, based on the total amount of 100% by weight of all the monomer units.

A preferred inventive copolymer rubber containing nitrile groups includes as α,β-ethylenically unsaturated nitrile unit (a) acrylonitrile or methacrylonitrile, more preferably acrylonitrile, as conjugated diene unit (b) isoprene or 1,3- butadiene, more preferably 1,3-butadiene, and as α,β-ethylenically unsaturated monocarboxylic acid monoester unit (c) butyl acrylate, methoxyethyl methacrylate or polyethylene glycol (meth)acrylate, more preferably polyethylene glycol (meth)acrylate having 5 repeat ethylene glycol units.

In addition, the copolymer rubber containing nitrile groups may contain one or more further copolymerizable monomers in an amount of 0.1% to 10% by weight, preferably 0.1% to 5% by weight. In that case, the amounts of the other monomer units are reduced in a suitable manner, such that the sum total is always 100% by weight. Further copolymerizable monomers which may be used are, for example,

- aromatic vinyl monomers, preferably styrene, α,β-styrene, α-methylstyrene and vinylpyridine,
- fluorinated vinyl monomers, preferably fluoroethyl vinyl ether, fluoropropyl vinyl ether, o-fluoromethylstyrene, vinyl pentafluorobenzoate, difluoroethylene and tetrafluoroethylene, or else
- α-olefins preferably $C_2$-$C_{12}$ olefins, for example ethylene, 1-butene, 4-butene, 4-methyl-1-pentene, 1-hexene or 1-octene,
- non-conjugated dienes, preferably $C_4$-$C_{12}$ dienes such as 1,4-pentadiene, 1,4-hexadiene, 4-cyanocyclohexene, 4-vinylcyclohexene, vinylnorbornene, dicylopentadiene or else
- alkynes such as 1- or 2-butyne,
- α,β-ethylenically unsaturated monocarboxytic acids, preferably acrylic acid, methacrylic acid, crotonic acid or cinnamic acid,
- α,β-ethylenically unsaturated dicarboxylic acids, preferably maleic acid, fumaric acid, citraconic acid, itaconic acid.
- α,β-ethylenically unsaturated dicarboxylic acid monoesters, for example
    - alkyl, especially $C_4$-$C_{18}$-alkyl, preferably n-butyl, tert-butyl, n-pentyl or n-hexyl, more preferably mono-n-butyl maleate, mono-n-butyl fumarate, mono-n-butyl citraconate, mono-n-butyl itaconate;
    - alkoxyalkyl, especially $C_4$-$C_{18}$-alkoxyalkyl, preferably $C_4$-$C_{12}$-alkoxyalkyl;
    - hydroxyalkyl, especially $C_4$-$C_{18}$-hydroxyalkyl, preferably $C_4$-$C_{12}$-hydroxyalkyl;
    - cycloalkyl, especially $C_5$-$C_{18}$-cycloalkyl, preferably $C_6$-$C_{12}$-cycloalkyl, more preferably monocyclopentyl maleate, monocyclohexyl maleate, monocycloheptyl maleate, monocyclopentyl fumarate, monocyclohexyl fumarate, monocycloheptyl fumarate, monocyclopentyl citraconate, monocyclohexyl citraconate, monocycloheptyl citraconate, monocyclopentyl itaconate, monocyclohexyl itaconale and monocycloheptyl ilaconate;
    - alkycycloalkyl, especially $C_6$-$C_{12}$-alkylcycloalkyl, preferably $C_7$-$C_{10}$-alkylcycloalkyl, more preferably monomethylcyctopentyl maleate and monoethylcyclohexyl maleate, monomemylcyclopentyl fumarate and monoethylcyclohexyl fumarate, monomethylcyclopentyl citraconate and monoethylcyclohexyl citraconate; monomethylcyclopentyl itaconate and monoethylcyclohexyl itaconate;
    - aryl, especially $C_8$-$C_{14}$-aryl, monoester, preferably monoaryl maleate, monoaryl fumarate, monoaryl citraconate or monoaryl itaconate, more preferably monophenyl maleate or monobenzyl maleate, monophenyl fumarate or monobenzyl fumarate, monophenyl citraconate or monobenzyl citraconate, monophenyl itaconate or monobenzyl itaconate or mixtures thereof;
    - unsaturated polyalkyl polycarboxylates, for example dimethyl maleate, dimethyl fumarate, dimethyl itaconate or diethyl itaconale; or
    - α,βethylenically unsaturated carboxylic esters containing amino groups, for example dimethylaminomethyl acrylate or diethylaminoethyl acrylate;
- copolymerizable antioxidants, for example N-(4-anilinophenyl)acrylamide, N-(4-anilinophenyl)methacrylamide, N-(4-anilinophenyl)cinnamide, N-(4-anilinophenyl)crotonamide, N-phenyl-4-(3-vinylbenzyloxy)aniline, N-phenyl-4-(4-vinylbenzyloxy)aniline or
- crosslinkable monomers, for example divinyl components, for example divinylbenzene; di(meth)acrylic esters, for example ethylene glycol di(meth)acrylate, diethylene glycol di(meth)acrylate, butanediol di(meth)acrylate or polyethylene glycol di(meth)acrylate, or tri(meth)acrylic esters, for example trimethylolpropane tri(meth)acrylate; self-crosslinkable monomers, for example N-methylol(meth)acrylamide or N,N-dimethylol(meth)acrylamide.

The inventive copolymer rubber containing nitrile groups typically has a number-average molecular weight (Mn) of 10 000 to 2 000 000 g/mol, preferably 50 000 to 1 000 000 g/mol, more preferably 100 000 to 500 000 g/mol and most preferably 150 000 to 300 000 g/mol.

The inventive copolymer rubber containing nitrite groups typically has a polydispersity index (PDI=$M_w/M_n$ where $M_w$ is the weight-average molecular weight) of 1.5 to 6, preferably 2 to 5 and more preferably 2.5 to 4.

The inventive copolymer rubber containing nitrile groups typically has a Mooney viscosity (ML 1+4@100° C.) of 10 to 150, preferably to 20 to 120 and more preferably of 25 to 100.

The inventive copolymer rubber containing nitrile groups is characterized in that

- the glass transition temperature, measured by the test method specified in the description, is tower than −20° C., preferably lower than −23° C. and more preferably tower than −25° C. or
- the oil swelling, measured by the test method specified in the description, is not more than 20%, preferably not more than 18% and more preferably not more than 15%, or
- the glass transition temperature, measured by the test method specified in the description, is lower than −20° C., preferably lower than −23° C. and more preferably tower than −25° C. and the oil swelling, measured by the test method specified in the description, is not more than 20%, preferably not more than 18% and more preferably not more than 15%.

Process for Preparing Copolymer Rubbers Containing Nitrile Groups

The process for preparing the aforementioned copolymer rubbers containing nitrile groups by polymerization of the aforementioned monomers has been described extensively in the literature (e.g. Houben-Weyl, Methoden der Organischen Chemie [Methods of Organic Chemistry], vol. 14/1, Georg Thieme Vertag Stuttgart 1961) and is not particularly restricted. In general the process is one in which α,β-ethylenically unsaturated nitrile units, conjugated diene units end α,β-ethylenically unsaturated monocarboxylic acid monoestars are copolymerized as desired. The polymerization process used may be any known emulsion polymerization process, suspension polymerisation process, bulk polymerization process and solution polymerization process. Preference is given to the emulsion polymerization process. Emulsion polymerization is especially understood to mean a process known per se in which the reaction medium used is usually water (see, inter alia, Römpp Lexikon der Chemie [Römpp's Chemistry Lexicon], volume 2, 10th edition 1997; P, A. Lovell, M. S. El-Aasser, Emulsion Polymerization and Emulsion Polymers, John Wiley & Sons, ISBN: 0471 96748 7; H. Gerrens, Fortschr. Hochpolym. Forsch. 1, 234 (1959)). The incorporation rate of the termonomer can be adjusted directly by the person skilled in the art, such that an inventive terpolymer is obtained.

Metathesis

It is also possible that the preparation of the copolymer rubbers containing nitrile groups is followed by a metathesis reaction to reduce the molecular weight of the copolymer rubber containing nitrile groups or a metathesis reaction and a subsequent hydrogenation, or a hydrogenation only. These metathesis or hydrogenation reactions are sufficiently well known to those skilled in the art and are described in the literature. Metathesis is known, for example, from WO-A-02/100941 and WO-A-02/100905 and can be used to reduce the molecular weight.

Hydrogenation

In an alternative embodiment, it is also possible to at least partly hydrogenate the copolymer rubbers containing nitrile groups after the copolymerization thereof (hydrogen addition reaction). In such at least partly hydrogenated copolymer rubbers containing nitrile groups, at least some of the C=C double bonds of the repeat unit derived from the conjugated diene have been specifically hydrogenated. The level of hydrogenation of the conjugated diene units (b), in an alternative embodiment, is preferably 50% or more, preferably 75% or more and more preferably 85% or more.

The hydrogenation of copolymer rubbers containing nitrile groups is known, for example from U.S. Pat. No. 3,700,837, DE A 2 539 132, DE A 3 048 008, DE A 3 048 251, DE A 3 227 650, DE A 3 329 974, EP A-111 412, FR-B 2 540 503. Hydrogenated copolymer rubbers containing nitrile groups are notable for high breaking strength, low abrasion, consistently low deformation altar pressure and tensile stress, and good oil resistance, but in particular for remarkable stability against thermal and oxidative influences.

Vulcanizable Mixtures Comprising Copolymer Rubber Containing Nitrile Groups

The present invention further provides vulcanizable mixtures comprising the copolymer rubber containing nitrile groups and at least one crosslinker. A preferred embodiment concerns vulcanizable mixtures which additionally comprise at least one filler.

Other Optional Components:

Optionally, vulcanizable mixtures of this kind may also comprise one or more familiar additives and fibrous materials to the person skilled in the art for rubbers. These include ageing stabilizers, reversion stabilizers, light stabilizers, antiozonants, processing aids, plasticizers, mineral oils, tackifiers, blowing agents, dyes, pigments, waxes, resins, extenders, fillers, carbon blacks, silicas, fumed silicas, natural materials, for example clay, kaolins, wollastonite, organic acids, vulcanization retardants, metal oxides, aramid fibres, salts of unsaturated carboxylic acids, for example zinc diacrylate (ZDA) and zinc dimethylacrylate (ZDMA), liquid acrylates, and further filler-activators, for example triethanolamine, trimethylolpropane, polyethylene glycol, hexanetriol, aliphatic trialkoxysilanes or other additives known in the rubber industry (Ullmann's Encyclopedia of Industrial Chemistry, VCH Verlagsgesellschaft mbH, D-69451 Weinheim, 1993, vol A 23 "Chemicals and Additives", p. 366-417).

Useful crosslinkers include, for example, peroxidic crosslinkers such as bis(2,4-dichlorobenzyl) peroxide, diberzoyl peroxide, bis(4-chlorobenzoyl) peroxide, 1,1-bis(t-butylperoxy)-3,3,5-trimethylcyclohexane, tert-butyl perbenzoate, 2,2-bis(t-butylperoxy)butane, 4,4-di-tert-butyl peroxynonylvalerate, dicumyl peroxide, 2,5-dimethyl-2,5-di(t-butylperoxy)hexane, tert-butyl cumyl peroxide, 1,3-bis(t-butylperoxyisopropyl)benzene, di-t-butyl peroxide and 2,5-dimethyl-2,5-di(t-butylperoxy)-3-hexyne.

It may be advantageous to use, as well as these peroxidic crosslinkers, also further additions which can help to increase the crosslinking yield: suitable examples thereof include triallyl isocyanurate, triallyl cyanurate, trimethylolpropane tri(meth)acrylate, triallyltrimellitate, ethylene glycol dimethacrylate, butanediol dimethacrylate, zinc diacrylate, zinc dimethacrylate, 1,2-polybutadiene or N,N'-m-phenylenebismaleimide.

The total amount of the crosslinker(s) is typically in the range from 1 to 20 phr, preferably in the range from 1.5 to 15 phr and more preferably in the range from 2 to 10 phr, based on the copolymer rubber containing nitrile groups.

Crosslinkers used may also be sulphur in elemental soluble or insoluble form, or sulphur donors.

Useful sulphur donors include, for example, dimorpholyl disulphide (DTDM), 2-morpholinodithiobenzothiazole (MBSS), caprolactam disulphide, dipentamethyilenethiuram tetrasulphide (DPTT) and tetramethylthiuram disulphide (TMTD).

In the case of sulphur vulcanization of the inventive copolymer rubber containing nitrile groups too, it is possible to use further additions which can help to increase the crosslinking yield. In principle, the crosslinking can also be effected with sulphur or sulphur donors alone.

Conversely, crosslinking of the inventive copolymer rubbers containing nitrile groups can also be effected in the presence of the abovementioned additions only, i.e. without addition of elemental sulphur or sulphur donors.

Suitable additions which can help to increase the crosslinking yield are, for example, dithiocarbamates, thiurams, thiazoles, sulphenamides, xanthogenates, guanidine derivatives, caprolactams and thiourea derivatives.

Dithiocarbamates used may be, for example: ammonium dimethyldithiocarbamate, sodium diethyldithiocarbamate (SDEC), sodium dibutyldithlocarbamate (SDBC), zinc dimethyldithiocarbamate (ZDMC), zinc diethyldithiocarbamate (ZDEC), zinc dibutyldithiocarbamate (ZDBC), zinc ethylphenyldithiocarbamate (ZEPC), zinc dibenzyldithiocarbamate (ZBEC), zinc pentamethylenedithiocarbamate (Z5MC), tellurium diethyldithiocarbamate, nickel dibutyldithiocarbamate, nickel dimethyldithiocarbamate and zinc diisononyldithiocarbamate.

Thiurams used may be, for example: tetramethylthiuram disulphide (TMTD), tetramethylthiuram monosulphide (TMTM), dimethyldiphenylthiuram disulphide, tetrabenzylthiuram disulphide, dipentamethylenethiuram tetrasulphide and tetraethylthiuram disulphide (TETD).

Thiazoles used may be, for example: 2-mercaptobenzothiazole (MBT), dibenzothiazyl disulphide (MBTS), zinc mercaptobenzothiazole (ZMBT) and copper 2-mercaptobenzothiazole.

Sulphenamide derivatives used may be, for example: N-cyclohexyl-2-benzothiazylsulphenamide (CBS), N-tert-butyl-2-benzothiazylsulphenamide (TBBS), N,N'-dicyclohexyl-2-benzothiazylsulphenamide (DCBS), 2-morpholinothiobenzothliazole (MBS), N-oxydiethylenethiocarbamyl-N-tert-butylsulphenamide and oxydiethylenethiocarbamyl-N-oxyethylenesulphenamide.

Xanthogenates used may be, for example: sodium dibutylxanthogenate, zinc isopropyldibutylxanthogenate and zinc dibutylxanthogenate.

Guanidine derivatives used may be, for example: diphenylguanidine (DPG), di-o-tolyguanidine (DOTG) and o-tolylbiguanide (OTBG).

Dithiophosphates used may be, for example: zinc dialkyldithiophosphates (chain length of the alkyl radicals $C_2$ to $C_{16}$), copper dialkyldithiophosphates (chain length of the alkyl radicals $C_2$ to $C_{16}$) and dithiophosphoryl polysulphide.

A caprolactam used may be, for example, dithiobiscaprolactam.

Thiourea derivatives used may be, for example, N,N'-diphenylthiourea (DPTU), diethylthiourea (DETU) and ethylenethiourea (ETU).

Likewise suitable as additions are, for example: zinc diaminedilsocyanate, hexamethylenetetramine, 1,3-bis(citraconimidomethyl)benzene and cyclic disulphanes.

The additions and also the crosslinking agents mentioned can be used either individually or in mixtures. Preference is given to using the following substances for the crosslinking of the copolymer rubbers containing nitrile groups: sulphur, 2-mercaptobenzothiazole, tetramethylthiuram disulphide, tetramethylthiuram monosulphide, zinc dibenzyldithiocarbamate, dipentamethylenethiuram tetrasulphide, zinc dialkyldithiophosphate, dimorpholyl disulphide, tellurium diethyldithiocarbamate, nickel dibutyldithiocarbamate, zinc dibutyldithiocarbamate, zinc dimethyldithiocarbamate and dithiobiscaprolactam.

The crosslinking agents and aforementioned additions can each be used in amounts of about 0.05 to 10 phr, preferably 0.1 to 8 phr, especially 0.5 to 5 phr (single dose, based in each case on the active substance), based on the copolymer rubber containing nine groups.

In the sulphur crosslinking, it may also be advisable, in addition to the crosslinking agents and the abovementioned additions, also to use further inorganic or organic substances as well, for example: zinc oxide, zinc carbonate, lead oxide, magnesium oxide, calcium oxide, saturated or unsaturated organic fatty acids and zinc salts thereof, polyalcohols, amino alcohols, for example triethanolamine, and amines, for example dibutylamine, dicyclohexylamine, cyctohexylethylamine, polyamines and polyether amines.

In the case of crosslinking with polyamines, for example, the free carboxyl groups of the additional monomers units are converted. The polyamine is not restricted in any particular way, provided that the crosslinker has at least two or more amino groups or is a substance that generates two or more amino groups in situ. Crosslinkers in which a plurality of hydrogens of an aliphatic or aromatic hydrocarbon are replaced by amino groups or hydrazide structures (represented as "—CONHNH$_2$," where CO is a carbonyl group) are preferred. Examples of polyamine crosslinkers include, by way of example, the following:

aliphatic polyamines, preferably hexamethylenediamine, hexamethylenediamine carbamate, tetramethylenepentamine, hexamethylenediamine-cinnamaldehyde adduct or hexamethylenediamine dibenzoate salts;

aromatic polyamines, preferably 2,2-bis(4-(4-aminophenoxy)phenyl)propane, 4,4'-methylenedianiline, m-phenylenediamine, p-phenylenediamine, 4,4'-(4,4'-isopropylidenediphenyl-1,1'-diyldioxy)dianiline;

or 4,4'-methylenebis(o-chloroaniline);

substances having at least two hydrazine structures, preferably isophthalic dihydrazide, adipic dihydrazide or sebacic dihydrazide.

Particularly preferred polyamines are hexamethylenediamine, hexamethylenediamine monocarbamate and (4,4'-isopropylidenediphenyl-1,1'-diyldioxy)dianiline. The amount of polyamine crosslinker in the vulcanizable mixture is typically in the range from 0.2% to 20% by weight, preferably in the range from 1% to 15% by weight and more preferably in the range from 1.5% to 10% by weight, based on 100% by weight of polymer.

Process for Producing a Vulcanizable Mixture Comprising Copolymer Rubber Containing Nitrile Groups The invention further provides a process for producing vulcanizable mixtures comprising copolymer rubber containing nitrite groups by mixing the copolymer rubber containing nitrile groups with at least one crosslinker and the further components optionally present. This mixing operation can be performed in all mixing units customary in the rubber industry, for example internal mixers. Banbury mixers or rollers. The sequence of metered addition can be determined without any problem by the person skilled in the art through suitable tests.

By way of example, two variants for the possible procedure are described hereinafter.

Process A: Production in an Internal Mixer

Preference is given to internal mixers with "intermeshing" rotor geometry.

At the start time, the internal mixer is charged with the copolymer rubber containing nitrite groups in bale form, and the bales are comminuted. After a suitable mixing period, the filters and additives are added. The mixing is effected under temperature control, with the proviso that the mixture remains at a temperature in the range from 130° C. to 150° C. for a suitable time. After a further suitable mixing period, the further mixture constituents are added, such as optionally stearic acid, antioxidants, plasterers, white pigments (for example titanium dioxide), dyes and other processing actives. After a further suitable mixing period, the internal mixer is vented and the shaft is cleaned. After a further suitable period, the internal mixer is emptied to obtain the vulcanizable mixture. Suitable periods are understood to mean a few seconds to a few minutes. The vulcanizable mixtures thus produced can be assessed in a customary manner, for instance by Mooney viscosity, by Mooney scorch or by a rheometer test.

Process B: Production on a Roll

If rolls are used as mixing units, it is possible to proceed in an analogous manner and sequence in the metered addition.

Process for Producing Vulcanizates Comprising Copolymer Rubber Containing Nitrile Groups The invention further provides the process for producing vulcanizates comprising copolymer rubbers containing nitrile groups (vulcanization), characterized in that the vutcanizable mixtures comprising copolymer rubbers containing nitrile groups are subjected to vulcanization, preferably at temperatures in the range from 100° C. to 250° C., more preferably at temperatures in the range from 150° C. to 200° C. and most preferably from 160° C. to 200° C. For this purpose, the vulcanizable mixtures are processed further with calenders, rolls or extruders. The preformed mass is then vulcanized in presses, autoclaves, hot air systems or in what are called automatic mat vulcanization systems ("Auma"), and useful temperatures have been found to be in the range from 120° C. to 200° C., preferably 140° C. to 190° C. The vulcanization time is typically 1 minute to 24 hours and preferably 2 minutes to 1 hour. Depending on the shape and size of the vulcanizates, a second vulcanization by reheating may be necessary to achieve complete vulcanization.

Vulcanizates

The invention further provides the vulcanizates thus obtainable, based on copolymer rubbers containing nitrile groups. The vulcanizates may take the form of moulded articles, which can be used, for example, as belts, rollers, shoe components, gaskets, hoses, damping elements, stators or cable sheaths, preferably drive belts. The aforementioned processes for producing the vulcanizates can be used for production of mouldings of any kind.

Use

The invention also provides for the use of the vulcanizates based on the inventive copolymer rubbers containing nitrile groups for production of shaped bodies, preferably of those which are produced by extrusion or injection moulding.

Mouldings

The invention further provides mouldings based on the inventive copolymer rubbers containing nitrile groups. The methods usable by way of example for this purpose such as moulding, injection moulding or extrusion processes, and the corresponding injection moulding apparatuses or extruders, are sufficiently well known to those skilled in the art. In the production of these mouldings, it is possible to supplement the inventive copolymer rubbers containing nitrile groups with the standard auxiliaries which are known to those skilled in the art and have to be suitably selected using customary art knowledge, for example filers, filter-activators, accelerators, crosslinkers, antiozonants, antioxidants, processing oils, extender oils, plasticizers, activators or scorch inhibitors.

The particular advantage of the invention is that the inventive copolymer rubber containing nitrite groups has a lower glass transition temperature, with the same oil resistance, than conventional types having the same acrylonitrile content.

EXAMPLES

Test Methods:

The RDB content (residual double bond content) in % is determined by the following FT-IR measurement; the IR spectra of the copolymer rubber containing nitrile groups before, during and after the hydrogenation are recorded by means of an IR instrument of the Thermo Nicolet FT-IR spectrometer, AVATAR 360 type. For this purpose, a monochlorobenzene solution of the copolymer rubber containing nitrile groups is applied to an NaCl disc, dried to a film and analysed. The hydrogenation level is determined by means of FT-IR analysis by the ASTM D 567095 method.

The values for the Mooney viscosity (ML 1+4@100° C.) are determined in each case by means of a shearing disc viscometer in accordance with DIN 53523/3.

The molecular weight was determined by gel permeation chromatography (GPC). A modular system was used, having a Shodex RI-71 differential refractometer, S 5200 autosampler (from SFD), column oven (ERC-125), Shimadzu LC 10 AT pump and a column combination of 3 "mixed-B" columns from Polymer Labs. The solvent used was tetrahydrduran; the molecular weights present are based on polystyrene standards from PSS (Mainz). The measurements were conducted at 40° C. and a flow rate of 1 mi/min in tetrahydrofuran.

The molecular parameters such as number-average molecular weight $M_n$, mass-average molecular weight $M_w$ and the resulting polydispersity index PDI were determined from the RI signal by means of the "Empower 2 data base" software from Waters.

The nitrogen content for determination of the ACN content in the copolymer rubbers containing nitrile groups is determined to QS 01960 by LECO TruSpec. Combustion of the sample weighed out in the CHN machine at about 950° C. in pure oxygen, aliquoting of the combustion gases, absorption of the disruptive components and detection of $N_2$ by TCD (thermal conductivity measurement cell).

The microstructure and the termonomer content of the individual polymers were determined by means of 1H NMR (instrument; Bruker DPX400 with TopSpin 1.3 software, measurement frequency 400 MHz, solvent 1,1,2,2-tetrachloroethane-d2).

The vulcanization characteristics of the rubber mixtures were determined by monitoring the torque as a function of vulcanization time with a moving die rheometer (MDR 2000E), measuring at an angle of 0.5° and an oscillation frequency of 1.7 Hz at 180° C. for 30 minutes.

For the tensile testing, 2 mm plaques were produced by vulcanization of the vulcanizable mixture at 180° C. The dumbbell-shaped test specimens were punched out of these plaques and tensile strength and elongation were determined to ASTM D2240-81.

Hardness was determined with a durometer to ASTM 02240-81.

The glass transition temperature of the copolymer rubber containing nitrile groups was determined with the aid of a DSC measurement. For this purpose, between 10 and 15 mg of sample were weighed into an aluminium boat and sealed. The boat was heated up twice from −100° C. to 100° C. at a heating rate of 20 K/minute in a Mettler Toledo DSC 821e/STAR SW 11.00 DSC instrument. The glass transition temperature was determined from the second heating curve by the standard method for finding the mean value. The glass transition temperature of the vulcanizate was determined with the aid of a DSC measurement. For this purpose, between 10 and 15 mg of sample were weighed into an aluminium boat and sealed. The boat was heated up twice from −150° C. to 150° C. at a heating rate of 10 K/minute in a DSC instrument from TA Instruments. The glass transition temperature was determined from the second heating curve by the standard method for finding the mean value.

To determine oil swelling, dumbbell-shaped test specimens as used for the tensile testing were stored in IRM 903 oil in a closed vessel at 150° C. for 7 days. Thereafter, the samples were measured and weighed, and the volume swelling and increase in mass were determined. Subsequently, tensile strength and elongation were determined to ASTM D2240-81.

The abbreviations given in the tables below have the following meanings:

| | |
|---|---|
| "RT" | room temperature (23 ± 2° C.) |
| "S min" | is the minimum torque of the crosslinking isotherm |
| "S max" | is the maximum torque of the crosslinking isotherm |
| "delta S" | is "S max − S min" |
| "TS1" | is the time by which the Mooney viscosity has increased by one unit after the Mooney viscosity minimum has been attained, compared to the starting point |
| "TS2" | is the time by which the Mooney viscosity has increased by two units after the Mooney viscosity minimum has been attained, compared to the starting point |
| "t 50" | is the time when 50% of S max is attained |
| "t 90" | is the time when 90% of S max is attained |

-continued

| | |
|---|---|
| "t 95" | is the time when 95% of S max is attained |
| "M 10" | modulus at 10% elongation, measured at RT |
| "M 25" | modulus at 25% elongation, measured at RT |
| "M 50" | modulus at 50% elongation, measured at RT |
| "M 100" | modulus at 100% elongation, measured at RT |
| "M 300" | modulus at 300% elongation, measured at RT |
| "EB" | elongation at break, measured at RT |
| "TS" | tensile strength, measured at RT |
| "H" | hardness, measured at RT |

The following substances were used in the examples:

The following chemicals were purchased as commercial products from the companies specified in each case, or originate from production plants of the companies specified.

| | |
|---|---|
| "Premix solution Fe(II)SO₄" | contains 0.986 g of Fe(II)SO₄*7 H₂O and 2.0 g of Rongalit ® C in 400 g of water |
| Rongalit C ® | sodium salt of a sulphinic acid derivative (commercial product from BASF SE) |
| t-DDM | tertiary dodecyl mercaptan (commercial product from LANXESS Deutschland GmbH) |
| Disponil ® SDS G | sodium laurylsulphate (commercial product from Cognis GmbH) |
| Trigonox ® NT 50 | p-menthane hydroperoxide (commercial product from Akzo-Degussa) |
| Na salt of disproportionated resin acid | Arizona Chemical GmbH, CAS 61790-51-0 |
| PEG5 | poly(ethylene glycol) methyl ether methacrylate, molecular weight 300 g/mol; Sigma-Aldrich |
| MEA | 2-methoxyethyl acrylate, Alfa Aesar |
| Na₂CO₃ | commercial product from Merck KGaA |
| Diethylhydroxylamine | commercial product from Merck KGaA |
| Vulkanox ® BKF | 2,2'-methylenebis(4-methyl-6-tert-butyl-phenol) (commercial product from Lanxess Deutschland GmbH) |

Other substances used in the polymerization or in the vulcanizable composition:

| | |
|---|---|
| Corax ® N330: | carbon black, commercially available from Orion Engineered Carbons |
| Rhenofit ® DDA: | 70% masterbatch based on octylated diphenylamine, produced by Rheinchemie |
| Vulkanox ® ZMB2/C5: | zinc salt of 4- and 5-methyl-2-mercaptobenzothiazole, commercially available from Lanxess |
| Perkadox ® 14-40: | di(tert-butylperoxyisopropyl)benzene 40% supported on silica, commercially available from Akzo Nobel Polymer Chemicals BV |
| TAIC: | triallyl isocyanurate, 70% masterbatch, commercially available from Kettlitz Chemie GmbH & Co KG |
| Maglite ®: | magnesium oxide, commercially available from CP Hall. |
| Corax ® N774: | carbon black, commercially available from Orion Engineered Carbons |
| Technora fibres 3 mm: | para-amid fibres, commercially available from Teijin |
| Uniplex 546 | Tri-2-ethylhexyl trimellitate (TOTM) commercially available from Lanxess |
| Luvomaxx CPDA | 4,4'-bis (1,1-dimethylbenzyl) diphenylamine commercially available from Lehmann & Voss |

I Preparation of the Copolymer Rubbers Containing Nitrile Groups (NBR) 1-3 (Inventive Examples)

NBR 1, 2 and 3 used in the example series which follow were produced according to the base formulation specified in Table 1, with all feedstocks stated in % by weighs based on 100% by weight of the monomer mixture. Table 1 also specifies the respective polymerization conditions.

TABLE 1

Preparation of the copolymer rubbers containing nitrile groups (NBR) 1-3 (inventive examples identified by an asterisk *)

| NBR | 1* | 2* | 3* |
|---|---|---|---|
| butadiene | 56 | 59 | 50 |
| acrylonitrile | 35 | 35 | 35 |
| 2-methoxyethyl acrylate (MEA) | 9 | — | 15 |
| poly(ethylene glycol) methyl ether methacrylate (PEG5) | — | 6 | — |
| Total amount of water | 190 | 190 | 190 |
| Disponil ® SDS G | 2.2 | 2.2 | 2.2 |
| Na salt of disproportioned resin acid | 0.5 | 0.5 | 0.5 |
| Na₂CO₃ | 0.12 | 0.12 | 0.12 |
| pH | 7.5 ± 0.5 | 7.5 ± 0.5 | 7.5 ± 0.5 |
| t-DDM | 0.54 | 0.545 | 0.54 |
| Trigonox ® NT 50 | 0.2 | 0.2 | 0.2 |
| Premix solution FeSO₄ | 0.014 | 0.025 | 0.02 |
| diethylhydroxylamine | 0.2 | 0.2 | 0.2 |
| Vulkanox ® BKF | 0.1 | 0.1 | 0.1 |
| Polymerization temperature [° C.] | 12 ± 0.5 | 12 ± 0.5 | 12 ± 0.5 |
| Polymerization conversion [%] | 76.8 | 72.2 | 75.8 |
| Polymerization time [h] | 6.5 | 3.4 | 6.6 |

The copolymer rubbers containing nitrile groups were prepared batchwise in a 20 l (NBR1) or 5 l autoclave (NBR2 and NBR3) with stirrer. In each of the autoclave batches, 5.4 kg (NBR1) or 1.3 kg (NBR2 and NBR3) of the monomer mixture and a total amount of water of 10.5 kg (NBR1) or 2.5 kg (NBR2 and NBR3) were used, as was EDTA in an equimolar amount based on the Fe(II). 2.2 kg or 9.4 kg of this amount of water were initially charged with the emulsifier in the autoclave and purged with a nitrogen stream. Thereafter, the destabilized monomers and the amount of the t-DDM molecular weight regulator specified in Table 1 were added and the reactor was closed. After the reactor contents had been brought to temperature, the polymerizations were started by the addition of the premix solutions and of para-menthane hydroperoxide (Trigonox® NT50).

The course of the polymerization was monitored by gravimetric determinations of conversion. On attainment of the conversions reported in Table 1, the polymerization was stopped by adding an aqueous solution of diethylhydroxylamine. Unconverted monomers and other volatile constituents were removed by means of steam distillation. The dried NBR rubbers were characterized via the Mooney viscosity, the ACN content and the glass transition temperature, and the content of the termonomers was determined by 1H NMR analysis (Table 2).

TABLE 2

Properties of the copolymer rubbers containing nitrile groups (NBR) 1-3 (inventive examples identified by an asterisk *)

| NPR | 1* | 2* | 3* |
|---|---|---|---|
| ACN content [% by wt.] | 33.6 | 34.6 | 33.6 |
| Mooney viscosity ML(1 + 4 @ 100° C.) (Mu) | 25 | 36 | 28 |
| Termonomer | MEA | PEG5 | MEA |
| Termonomer incorporated [% by wt.] | 4.8 | 4.1 | 7.7 |
| Glass transition temperature Tg [° C.] | −23 | −26 | −26 |

II Preparation of the Hydrogenated Copolymer Rubbers Containing Nitrile Groups (HNBR)

Procedure for the Hydrogenations

The hydrogenations which follow were conducted using the above-synthesized copolymer rubbers containing nitrile groups (NBR) 1*-3*.

Dry monochlorobenzene (MCB) was purchased from VWR and used as obtained. The results of the hydrogenation experiments are compiled in Table 2.

Hydrogenations 1-3 were conducted in a 10 l high-pressure reactor under the following conditions:

| | |
|---|---|
| Solvent: | monochlorobenzene |
| Solids concentration: | 13% by wt. of NBR terpolymer in MCB (518 g) |
| Reactor temperature: | 137-140° C. |
| Reaction time: | up to 4 hours |
| Catalyst & loading: | Wilkinson catalyst: 112.2 g (0.065 phr); Co-catalyst: triphenylphosphine: 11.7 g (1.0 phr) |
| Hydrogen pressure (p $H_2$): | 8.4 MPa |
| Stirrer speed: | 600 rpm |

The polymer solution containing NBR terpolymer is degassed 3 times with $H_2$ (23° C., 2 MPa) under vigorous stirring. The temperature of the reactor was raised to 100° C. and the $H_2$ pressure to 6 MPa. 123.9 g of a chlorobenzene solution consisting of Wilkinson catalyst (112.2 g) and triphenylphosphine (11.7 g) were added and the pressure was raised to 8.4 MPa, while the reactor temperature was adjusted to 138° C. Both parameters were kept constant during the reaction. The course of the reaction was monitored by means of measurement of the residual double bond content (RDB) of the copolymer rubber containing nitrile groups by means of IR spectroscopy. The reaction was ended after not more than 4 hours and/or attainment of an RDB content of <1% by releasing the hydrogen pressure. The final RDB value determined by means of IR was checked by means of $^1H$ NMR spectroscopy.

III Production of Vulcanizates of the Hydrogenated Copolymer Rubber Containing Nitrile Groups:

Production of the Vulcanizable Mixtures:

HNBR 1*: Hydrogenated nitrile-butadiene-methoxyethyl acrylate terpolymer having an ACN content of 33.6%, a methoxyethyl acrylate (MEA) content of 4.8% and a Mooney viscosity (ML 1+4 @100° C.) of 67.

HNBR 2*: Hydrogenated nitrile-butadiene-methoxyethyl acrylate terpolymer having an ACN content of 34.6%, a polyethylene glycol acrylate (PEG5) content of 4.1% and a Mooney viscosity (ML 1+4 @100° C.) of 88.

HNBR 3*: Hydrogenated nitrile-butadiene-methoxyethyl acrylate terpolymer having an ACN content of 33.6%, a methoxyethyl acrylate (MEA) content of 7.7% and a Mooney viscosity (ML1+4 @100° C.) of 72.

HNBR 4 (Therban 3407): Commercially available hydrogenated nitrile-butadiene copolymer having an ACN content of 34%, a residual double bond content of less than 0.9% and a Mooney viscosity (ML 1+4 @100° C.) of 70.

TABLE 4

Composition of the vulcanizable mixtures
(inventive examples identified by an asterisk *)

| Example | | 1* | 2* | 3* | 4 | 5* |
|---|---|---|---|---|---|---|
| Rubber | parts | parts | parts | parts | parts |  |
| HNBR 1* |  | 100 |  |  |  |  |
| HNBR 2* |  |  | 100 |  |  | 100 |
| HNBR 3* |  |  |  | 100 |  |  |
| HNBR 4 |  |  |  |  | 100 |  |
| Other components | phr | phr | phr | phr | phr |  |
| CORAX N330 |  | 30 | 30 | 30 | 30 | 30 |
| RHENOFIT DDA |  | 1.4 | 1.4 | 1.4 | 1.4 |  |
| VULKANOX ZMB2/C5 |  | 0.4 | 0.4 | 0.4 | 0.4 | 0.4 |

TABLE 4-continued

Composition of the vulcanizable mixtures
(inventive examples identified by an asterisk *)

| Example | 1* | 2* | 3* | 4 | 5* |
|---|---|---|---|---|---|
| PERKADOX 14-40 | 7 | 7 | 7 | 7 | 8 |
| TAIC 70% | 1.5 | 1.5 | 1.5 | 1.5 | 1.5 |
| MAGLITE | 2 | 2 | 2 | 2 | 3 |
| CORAX N774 |  |  |  |  | 30 |
| TOTM |  |  |  |  | 4 |
| Technora 3 mm |  |  |  |  | 5 |
| Luvomaxx CDPA |  |  |  |  | 1.1 |

All the rubber mixtures were produced on a mixing roll mill. The diameter of the rolls was 80 mm, the length 200 mm. The rolls were preheated to 40° C.; the speed of the front roll was 16.5 rpm, that of the rear roll 20 rpm, which achieved a friction of 1:1.2.

The rubber was initially charged and mixed for one (1) minute until a smooth milled sheet had formed. Subsequently, first the carbon black, then the additives and finally the crosslinking chemicals were mixed in. The total mixing time was 5 to 8 minutes.

TABLE 5

Vulcanization characteristics of the rubber mixtures

| MDR 180° C. |  | 1* | 2* | 3* | 4 | 5* |
|---|---|---|---|---|---|---|
| S' min | dNm | 1.27 | 1.61 | 1.22 | 1.41 | 2.35 |
| S' max | dNm | 17.77 | 17.96 | 17.65 | 20.71 | 28.92 |
| S' end | dNm | 17.62 | 17.85 | 17.48 | 20.64 | 28.09 |
| delta S' | dNm | 16.5 | 16.35 | 16.43 | 19.3 | 26.57 |
| TS 1 | s | 33 | 32 | 32 | 32 | 29.4 |
| TS 2 | s | 43 | 41 | 42 | 41 | 37.2 |
| t 50 | s | 112 | 109 | 111 | 117 | 119.05 |
| t 90 | s | 308 | 310 | 305 | 330 | 313.29 |
| t 95 | s | 390 | 401 | 387 | 426 | 391.55 |

The mouldings for the performance of the further determinations were produced by vulcanization at 180° C. for 10 minutes.

TABLE 6

Physical properties of the unaged vulcanizates

| Tensile test | | 1* | 2* | 3* | 4 | 5*[a] | 5*[b] |
|---|---|---|---|---|---|---|---|
| 2 mm plaques vulcanized at 180° C. for 10 minutes |  |  |  |  |  |  |  |
| M 10 | MPa | 0.6 | 0.6 | 0.5 | 0.6 | 1.1 | 3.5 |
| M 25 | MPa | 1 | 0.9 | 0.9 | 1 | 2.1 | 9 |
| M 50 | MPa | 1.4 | 1.3 | 1.4 | 1.4 | 3.5 | 10.4 |
| M 100 | MPa | 2.5 | 2.3 | 2.7 | 2.8 | 7.6 | 12.8 |
| M 300 | MPa | 20.6 | 21.5 | 23.3 | 23.8 | — | — |
| EB | % | 347 | 347 | 331 | 322 | 173 | 145 |
| TS | MPa | 26 | 27 | 28 | 27 | 17.2 | 18.7 |
| H | ShA | 63 | 62 | 61 | 62 | 80 | 80 |

[a]against direction of fibre
[b]in direction of fibre

TABLE 7

Glass transition temperature of the unaged vulcanizates

| Glass transition temperature | 1* | 2* | 3* | 4 | 5* |
|---|---|---|---|---|---|
| Tg (DSC, ° C.) | −29 | −29 | −28 | −26 | −27 |

TABLE 8

Physical properties of the vulcanizates which have been aged in hot air

| Tensile test | | 1* | 2* | 3* | 4 |
|---|---|---|---|---|---|
| Ageing of the vulcanizates in hot air, 168 h at 150° C. | | | | | |
| M 10 | MPa | 0.8 | 0.8 | 0.8 | 0.8 |
| M 25 | MPa | 1.5 | 1.4 | 1.4 | 1.4 |
| M 50 | MPa | 2.3 | 2.3 | 2.3 | 2.1 |
| M 100 | MPa | 4.9 | 4.8 | 5.2 | 4.8 |
| M 300 | MPa | 24.2 | 25.2 | 29.1 | — |
| EB | % | 337 | 338 | 298 | 261 |
| TS | MPa | 27.6 | 28.8 | 29.1 | 23.7 |
| H | ShA | 71 | 70 | 71 | 69 |

TABLE 9

Change in the vulcanizate properties or ageing in hot air

| Change | | 1* | 2* | 3* | 4 |
|---|---|---|---|---|---|
| Ageing of the vulcanizates in hot air, 168 h at 150° C. | | | | | |
| Δ EB | % | −3 | −3 | −10 | −19 |
| Δ TS | % | 5 | 6 | 4 | −12 |
| Δ H | ShA | 8 | 8 | 10 | 8 |

TABLE 10

Ageing of the vulcanizates in IRM 903

| Tensile test | | 1* | 2* | 3* | 4 | 5* |
|---|---|---|---|---|---|---|
| Ageing of the vulcanizates in IRM 903, 168 h at 150° C. | | | | | | |
| M 10 | MPa | 0.5 | 0.4 | 0.5 | 0.4 | 3.7 |
| M 25 | MPa | 0.8 | 0.8 | 0.8 | 0.8 | 9.7 |
| M 50 | MPa | 1.2 | 1.2 | 1.3 | 1.3 | 10.8 |
| M 100 | MPa | 2.6 | 2.3 | 2.8 | 3 | 13.1 |
| M 300 | MPa | — | — | — | — | — |
| EB | % | 267 | 273 | 233 | 233 | 144 |
| TS | MPa | 18.1 | 18.9 | 15.7 | 16.3 | 18.6 |
| H | ShA | 56 | 55 | 56 | 54 | 79 |

TABLE 11

Change in the vulcanizate properties on ageing in oil

| Change | | 1* | 2* | 3* | 4 | 5* |
|---|---|---|---|---|---|---|
| Ageing of the vulcanizates in IRM 903, 168 h at 150° C. | | | | | | |
| Δ EB | % | −23 | −21 | −30 | −28 | −1 |
| Δ TS | % | −31 | −31 | −44 | −39 | −1 |
| Δ H | ShA | −7 | −7 | −5 | −8 | −1 |
| Δ V | % | 16 | 17 | 15 | 21 | 6 |

Oil swelling (ΔV), just like the glass transition temperature (Tg), is distinctly reduced in the vulcanizates based on the inventive copolymer rubbers 1*-3*, compared to the vulcanizate based on the noninventive HNBR 4.

What is claimed is:

1. A copolymer rubber containing nitrile groups, wherein, based on a total amount of 100% by weight of all monomer units, the rubber comprises:
   20% to 50% by weight of α,β-ethylenically unsaturated nitrile units,
   42% to 78.75% by weight of conjugated diene units, and
   1.25% to 8% by weight of at least one α,β-ethylenically unsaturated monocarboxylic acid monoester units, wherein
   the α,β-ethylenically unsaturated nitrile units are selected from the group consisting of: acrylonitrile, methacrylonitrile, ethacrylonitrile, and mixtures thereof,
   the conjugated diene units have a level of hydrogenation of 75% or more, and are selected from the group consisting of: 1,3-butadiene, isoprene, 2,3-dimethylbutadiene, 1,3-pentadiene (piperylene), and mixtures thereof, and
   the α,β-ethylenically unsaturated monocarboxylic acid monoesters are selected from the group consisting of: methoxy and ethoxy polyethylene glycol (meth)acrylates having 1 to 20 repeat ethylene glycol units,
   the rubber has:
   a glass transition temperature lower than −23° C., and
   an oil swelling of not more than 18 vol %.

2. A copolymer rubber containing nitrile groups, wherein, based on a total amount of 100% by weight of all monomer units, the rubber comprises:
   34% to 43% by weight of α,β-ethylenically unsaturated nitrile units which are acrylonitrile,
   49% to 64.5% by weight of conjugated diene units having a level of hydrogenation of 85% or more, and are 1,3-butadiene, and
   1.5% to 8% by weight of α,β-ethylenically unsaturated monocarboxylic acid monoesters selected from the group consisting of: methoxy and ethoxy polyethylene glycol (meth)acrylate having 1 to 5 repeat ethylene glycol units
   the rubber has:
   glass transition temperature lower than −25° C., and
   an oil swelling of not more than 15 vol %.

3. A copolymer rubber containing nitrile groups, wherein, based on a total amount of 100% by weight of all monomer units, the rubber comprises:
   10% to 60% by weight of α,β-ethylenically unsaturated nitrile units,
   31% to 89 by weight of conjugated diene units, and
   1% to 9% by weight of methoxy or ethoxy polyethylene glycol (meth)acrylate units having 1 to 20 repeat ethylene glycol units.

* * * * *